US012237972B2

(12) United States Patent
Corston-Petrie et al.

(10) Patent No.: US 12,237,972 B2
(45) Date of Patent: Feb. 25, 2025

(54) METHOD OF OPERATING A TELECOMMUNICATIONS NETWORK

(71) Applicant: BRITISH TELECOMMUNICATIONS PUBLIC LIMITED COMPANY, London (GB)

(72) Inventors: Andrew Corston-Petrie, London (GB); Ruth Brown, London (GB); Jonathan Hart, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 56 days.

(21) Appl. No.: 18/548,176

(22) PCT Filed: Feb. 18, 2022

(86) PCT No.: PCT/EP2022/054136
§ 371 (c)(1),
(2) Date: Aug. 28, 2023

(87) PCT Pub. No.: WO2022/184476
PCT Pub. Date: Sep. 9, 2022

(65) Prior Publication Data
US 2024/0146607 A1    May 2, 2024

(30) Foreign Application Priority Data

Mar. 1, 2021 (GB) ..................................... 2102850

(51) Int. Cl.
*H04L 41/084* (2022.01)
(52) U.S. Cl.
CPC .................................. *H04L 41/084* (2013.01)
(58) Field of Classification Search
CPC ..................................................... H04L 41/084
See application file for complete search history.

(56) References Cited

U.S. PATENT DOCUMENTS

| 6,704,752 B1 | 3/2004 | Kathail et al. |
| 7,162,537 B1 | 1/2007 | Kathail |

(Continued)

FOREIGN PATENT DOCUMENTS

| EP | 1326375 A1 | 7/2003 |
| EP | 2445141 B1 | 3/2019 |
| EP | 3544330 A1 | 9/2019 |

OTHER PUBLICATIONS

Combined Search and Examination Report for GB2004696.7, dated Jan. 7, 2021, 10 pages.

(Continued)

*Primary Examiner* — Nazia Naoreen
(74) *Attorney, Agent, or Firm* — Nixon & Vanderhye P.C.

(57) ABSTRACT

A computer-implemented method (300) of operating a telecommunications network (110-1), said telecommunications network comprising a plurality of nodes (150), and the method comprising the steps of: storing: a set of historic reconfiguration instructions, said instructions having been used to reconfigure the telecommunications network; first status information from each of the plurality of nodes, wherein said first status information is received prior to reconfiguring the telecommunications network according to a given historic reconfiguration instruction; and second status information from each of the plurality of nodes, wherein said second status information is received after reconfiguring the telecommunications network according to the given historic reconfiguration instruction; receiving a new reconfiguration instruction (310); prior to reconfiguring the telecommunications network according to the new reconfiguration instruction, identifying from the set a similar historic reconfiguration instruction having a similarity to the new reconfiguration instruction within a tolerance threshold; comparing the first and the second status information associated with the identified similar historic reconfiguration (Continued)

instruction so as to determine whether the identified similar historic reconfiguration instruction resulted in a detrimental effect to performance of the telecommunications network; in dependence on whether the identified similar historic reconfiguration instruction resulted in a detrimental effect, calculating a success confidence metric for the new reconfiguration instruction, said metric representing a probability that a reconfiguration instruction does not result in a detrimental effect to performance of the telecommunications network (320); and if the success confidence metric is: greater than a predetermined threshold value, reconfiguring the telecommunications network according to the new reconfiguration instruction (350); or less than a predetermined threshold value, preventing reconfiguration of the telecommunications network according to the new reconfiguration instruction (360).

20 Claims, 4 Drawing Sheets

(56) References Cited

U.S. PATENT DOCUMENTS

| | | | |
|---|---|---|---|
| 7,290,164 | B1 | 10/2007 | Harvey et al. |
| 9,247,440 | B2 | 1/2016 | Ho et al. |
| 10,164,858 | B2 | 12/2018 | Gunasekara et al. |
| 10,218,575 | B2 * | 2/2019 | Reid ............... H04L 41/147 |
| 10,469,318 | B1 | 11/2019 | Parthasarathy et al. |
| 10,476,985 | B1 | 11/2019 | Spina et al. |
| 10,735,258 | B2 * | 8/2020 | Porter ............... H04L 41/0661 |
| 10,756,970 | B1 * | 8/2020 | Hermoni ............... H04L 41/149 |
| 2014/0280833 | A1 | 9/2014 | Gao et al. |
| 2017/0124487 | A1 | 5/2017 | Szeto et al. |
| 2018/0270122 | A1 | 9/2018 | Brown et al. |
| 2019/0273672 | A1 | 9/2019 | Shaw et al. |
| 2019/0342338 | A1 | 11/2019 | Anandam et al. |
| 2020/0336374 | A1 | 10/2020 | Clark et al. |
| 2021/0014127 | A1 | 1/2021 | Iyengar et al. |

OTHER PUBLICATIONS

European Search Report for EP20167212.8 dated Oct. 1, 2020, 9 pages.
Examination Report for GB2004696.7, dated Jul. 18, 2022, 3 pages.
International Preliminary Report on Patentability for PCT/EP2021/053027 dated Oct. 13, 2022, 9 pages.
International Search Report and Written Opinion of the ISA for PCT/EP2021/053027 dated Apr. 14, 2021, 13 pages.
International Search Report and Written Opinion of the ISA for PCT/EP2022/054136 dated May 27, 2022, 17 pages.
Muriel Figueredo Franco et al., "Brain: Blockchain-based Reverse Auction for Infrastructure Supply in Virtual Network Functions-as-a-Service", IFIP Networking Conference, May 20, 2019, 9 pages.
Paper: Adwait Tumbde et al., "Configuration Data Deserves a Database", 2009, 5 pages.
Search Report for GB2102850.1 dated Jun. 25, 2021, 4 pages.

* cited by examiner

METHOD OF OPERATING A TELECOMMUNICATIONS NETWORK

CROSS-REFERENCE TO RELATED APPLICATIONS

This application is the U.S. national phase of International Application No. PCT/EP2022/054136 filed Feb. 18, 2022, which designated the U.S. and claims priority to GB 2102850.1 filed Mar. 1, 2021, the entire contents of each of which are hereby incorporated by reference.

FIELD OF INVENTION

The present invention relates to a method of operating a telecommunications network, and in particular to a computer-implemented method of assessing a configuration for the telecommunications network, as well as to a telecommunications network therefor.

BACKGROUND

Telecommunications networks are expected to grow in scale and complexity, as well as to adopt greater 'softwarization', which affords greater flexibility as to how telecommunications networks are configured.

With this increased complexity and flexibility, reconfigurations to a telecommunications network may require greater scrutiny in order to ensure that reconfigurations are unlikely to cause detrimental effects to the operation of the telecommunications network. Reconfigurations may therefore be assessed so as to avoid unplanned network downtime (which may cause a breach in a Service Level Agreement) and in turn reputational and/or financial damage for a telecommunications network operator.

Currently, manual user input may be required in order to plan, verify and implement reconfigurations to a telecommunications network. To limit the extent of any detrimental effects to a telecommunications network, reconfigurations are typically applied step-wise to limited and isolated portions of the telecommunications network, such as only to a particular network domain, rather than network-wide.

As such, reconfiguring telecommunications networks may be a slow, resource-intensive and poorly-scalable process, especially as telecommunications networks grow in size and complexity.

It is therefore an aim of the present invention to alleviate at least some of the aforementioned problems.

STATEMENTS OF INVENTION

According to a first aspect of the present invention, there is provided: A computer-implemented method of operating a telecommunications network, said telecommunications network comprising a plurality of nodes, and the method comprising the steps of: storing: a set of historic reconfiguration instructions, said instructions having been used to reconfigure the telecommunications network; first status information from each of the plurality of nodes, wherein said first status information is received prior to reconfiguring the telecommunications network according to a given historic reconfiguration instruction; and second status information from each of the plurality of nodes, wherein said second status information is received after reconfiguring the telecommunications network according to the given historic reconfiguration instruction; receiving a new reconfiguration instruction; prior to reconfiguring the telecommunications network according to the new reconfiguration instruction, identifying from the set a similar historic reconfiguration instruction having a similarity to the new reconfiguration instruction within a tolerance threshold; comparing the first and the second status information associated with the identified similar historic reconfiguration instruction so as to determine whether the identified similar historic reconfiguration instruction resulted in a detrimental effect to performance of the telecommunications network; in dependence on whether the identified similar historic reconfiguration instruction resulted in a detrimental effect, calculating a success confidence metric for the new reconfiguration instruction, said metric representing a probability that a reconfiguration instruction does not result in a detrimental effect to performance of the telecommunications network; and if the success confidence metric is: greater than a predetermined threshold value, reconfiguring the telecommunications network according to the new reconfiguration instruction; or less than a predetermined threshold value, preventing reconfiguration of the telecommunications network according to the new reconfiguration instruction.

Preferably, the first status information is retrieved immediately (or directly) prior to reconfiguring the telecommunications network according to the given reconfiguration instruction without effecting any intervening reconfiguration instruction. Preferably, the second status information is retrieved immediately (or directly) after reconfiguring the telecommunications network according to the given reconfiguration instruction without effecting any intervening reconfiguration instruction. Optionally, said each of the plurality of nodes are only target nodes of a given reconfiguration instruction. Optionally, said each of the plurality of nodes are all the nodes of the telecommunications network. Preferably, as used herein, a "detrimental effect to performance of the telecommunications network" connotes a quantitative and/or qualitative reduction in performance. Preferably, said detrimental effect is only an unintentional detrimental effect, such that the effect being detrimental is not the intention of a reconfiguration instruction, optionally as determined by assessing whether the reconfiguration instruction explicitly instructed the detrimental effect. Preferably, the reconfiguring is performed without further user input, or automatically.

Preferably, identifying the similar historic reconfiguration instruction comprises comparing a similarity of a target node of each historic reconfiguration instruction to a target node of the new reconfiguration instruction. Preferably, said similarity is in terms of the identity and/or function of target nodes. Preferably, all target nodes of each historic reconfiguration instruction are compared to all target nodes of the new reconfiguration instruction. Preferably, the identified similar historic reconfiguration instruction comprises all, and more preferably only all, of the target nodes of the new reconfiguration instruction.

Preferably, identifying the similar historic reconfiguration instruction comprises comparing a similarity of a reconfiguration action of each historic reconfiguration instruction to a reconfiguration action of new reconfiguration instruction. Preferably, all reconfiguration actions of each historic reconfiguration instruction are compared to all reconfiguration actions of the new reconfiguration instruction.

Preferably, the identified similar historic reconfiguration instruction comprises the same, and more preferably only the same, reconfiguration action as the new reconfiguration action.

Preferably, the method further comprises the step of determining a level of similarity between the new reconfiguration instruction and the identified similar historic reconfiguration instruction, wherein the success confidence metric is calculated in dependence on said level of similarity, and preferably, such that a greater success confidence metric is output for a greater level of similarity.

Preferably, the method further comprises the step of determining an extent of the detrimental effect to performance, and wherein the success confidence metric is calculated in dependence on said extent of the detrimental effect (also referred to as downside risk), and preferably such that a lower success confidence metric is output for a greater extent of the detrimental effect.

Preferably, the success confidence metric is calculated as a function of a proportion of: a total number of identified similar historic reconfigurations that are determined to have resulted in a detrimental effect to performance; and the total number of identified similar historic reconfigurations.

Preferably, the method further comprises the steps of: prior to reconfiguring the telecommunications network according to the new reconfiguration instruction, receiving and storing, in respect of the new reconfiguration instruction, first status information from each of the plurality of nodes; in response to reconfiguring the telecommunications network according to the new reconfiguration instruction, receiving and storing, in respect of the new reconfiguration instruction, second status information from each of the plurality of nodes; and storing the new reconfiguration instruction, wherein said new reconfiguration instruction is available (instead) to be a historic reconfiguration instruction in a further iteration of the method.

Preferably, the method further comprises the steps of identifying a plurality of similar historic reconfiguration instructions, and calculating the success confidence metric in dependence on all of the identified similar historic reconfiguration instructions.

Preferably, the method further comprises the steps of: in the event of preventing reconfiguration of the telecommunications network according to the new reconfiguration instruction, identifying, from the plurality of similar historic reconfiguration instructions, a substitute historic reconfiguration instruction that is determined not to have resulted in a detrimental effect; and reconfiguring the telecommunications network according to the substitute historic reconfiguration instruction. Preferably, the substitute historic reconfiguration instruction is identified as being the most similar to the new reconfiguration instruction. Preferably, the substitute historic reconfiguration instruction is identified as having caused the least detrimental effect to performance.

Preferably, the method further comprises the step of storing sequence information of a sequence in which the historic reconfiguration instructions are used to reconfigure the telecommunications network; wherein the identifying the similar historic reconfiguration instruction comprises comparing the sequence information of each historic reconfiguration instruction to the sequence information reconfiguration action of new reconfiguration instruction, and more preferably such that the more similar the sequence information, the more similar the reconfiguration instructions.

Preferably, the success confidence metric is calculated in dependence on the sequence information, and more preferably by processing the sequence information of historic reconfiguration instructions to identify a sequence of historic reconfiguration instructions that result in a detrimental effect to performance, and comparing said sequence information to the sequence information of the new reconfiguration instruction.

Preferably, calculating the success confidence metric is further performed in dependence upon a risk value associated with the new reconfiguration instruction.

According to another aspect of the invention, there is provided computer-readable carrier medium comprising a computer program, which, when the computer program is executed by a computer, causes the computer to carry out any of the steps described above.

According to yet another aspect of the invention, there is provided a telecommunications network comprising: a plurality of nodes; a database configured to store: a set of historic reconfiguration instructions, said instructions having been used to reconfigure the telecommunications network; first status information from each of the plurality of nodes, wherein said first status information is received prior to reconfiguring the telecommunications network according to a given historic reconfiguration instruction; and second status information from each of the plurality of nodes, wherein said second status information is received after reconfiguring the telecommunications network according to the given historic reconfiguration instruction; a processor configured to: receive a new reconfiguration instruction; identify, prior to reconfiguring the telecommunications network according to the new reconfiguration instruction, from the set a similar historic reconfiguration instruction having a similarity to the new reconfiguration instruction within a tolerance threshold; compare the first and the second status information associated with the identified similar historic reconfiguration instruction so as to determine whether the identified similar historic reconfiguration instruction resulted in a detrimental effect to performance of the telecommunications network; calculate, in dependence on whether the identified similar historic reconfiguration instruction resulted in a detrimental effect, a success confidence metric for the new reconfiguration instruction, said metric representing a probability that a reconfiguration instruction does not result in a detrimental effect to performance of the telecommunications network; and a controller configured to: reconfigure the telecommunications network according to the new reconfiguration instruction if the success confidence metric is greater than a predetermined threshold value; and prevent reconfiguration of the telecommunications network according to the new reconfiguration instruction if the success confidence metric is less than a predetermined threshold value.

Preferably, the telecommunications network is in the form of a wide area cellular telecommunications network.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a computer-implemented method of operating a telecommunications network and to a telecommunications network as described herein and/or substantially as illustrated with reference to the accompanying drawings. The present invention is now described, purely by way of example, with reference to the accompanying diagrammatic drawings, in which.

SPECIFIC DESCRIPTION

Figure 1:
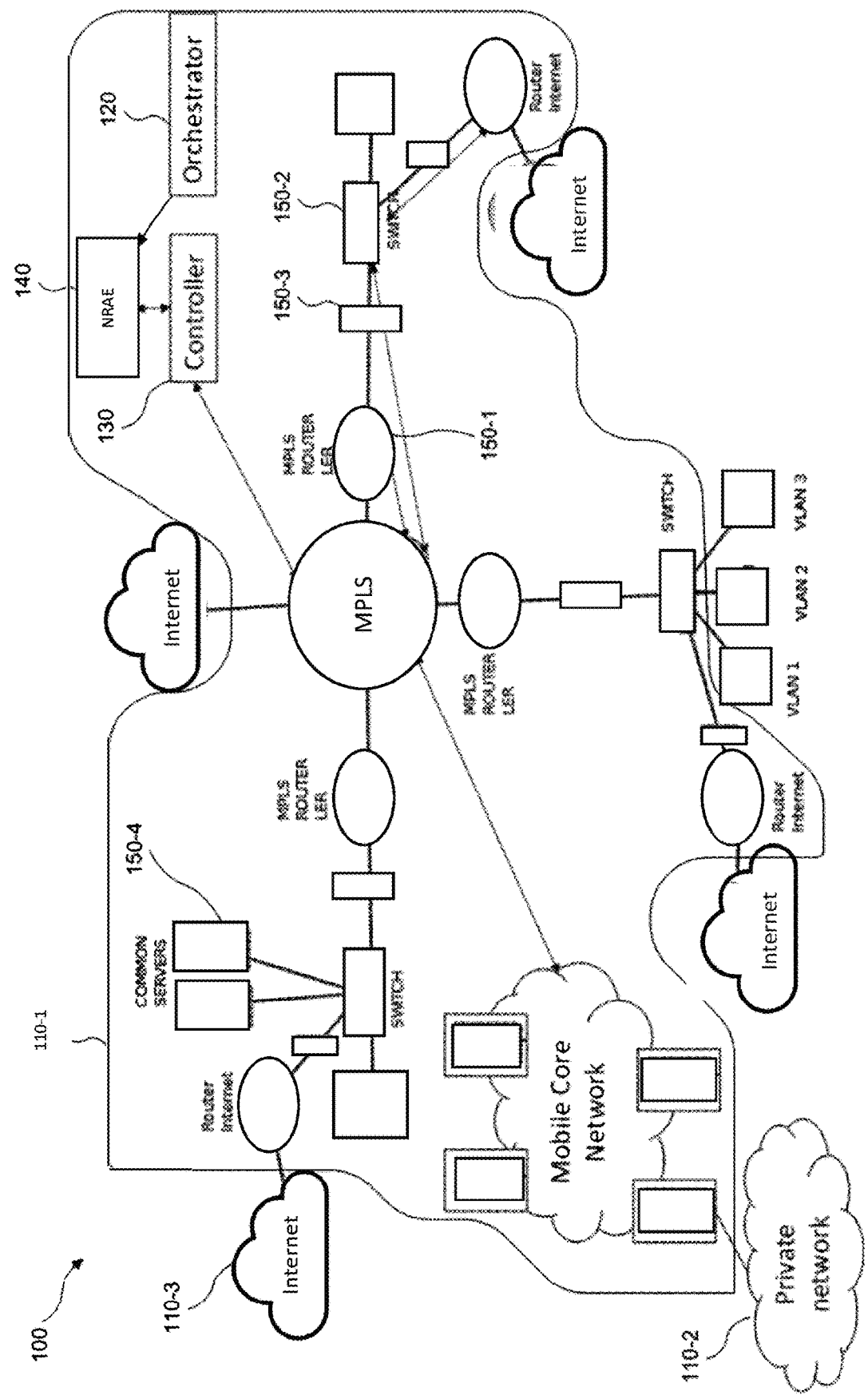
FIG. 1 shows a schematic diagram of an exemplary telecommunications network comprising a Network Reconfiguration Assessment Engine (NRAE)

FIG. 1 is a schematic diagram of an exemplary telecommunications network 100, comprising a wide area telecommunications network in the form of a cellular telecommunications network 110-1, which is available to communicate with other networks, including a private telecommunications network 110-2 and the Internet 110-3.

The network 110-1 comprises a/an: orchestrator 120; controller 130; Network Reconfiguration Assessment Engine (NRAE) 140; and plurality of network nodes 150.

The network nodes 150 are functional components of the network 110-1 that help facilitate operation of the network 110-1, and include a: router 150-1 (including a Multiprotocol Label Switching router); switch 150-2; firewall 150-3; and server 150-4. Although not shown in FIG. 1, the network nodes 150 are also available to be in the form of a/an: gateway; access point; database; controller or processor; or virtualised network function.

The orchestrator 120 is configured to generate reconfiguration instructions for reconfiguring the network nodes 150. In turn, the controller 130 is configured to implement reconfiguration instructions by communicating the reconfiguration instructions to target network nodes 150, thereby to change operation of the target network nodes 150.

A reconfiguration instruction comprises reconfiguration parameters in the form of: a unique identity (e.g. a network address) of a target node (e.g. switch 150-2); and a reconfiguration action, which is an instruction to the target node that causes a change in the operational state of that target network node. For example, a reconfiguration action is available to be in the form of a/an:
  winding-up or down of processing (e.g. CPU) and memory (e.g. RAM) resources;
  reboot, restart and/or shut down;
  creation of a new virtualised network node and/or function;
  change to a security policy;
  configuration of wireless transmission parameters (e.g. transmission power and/or spectral frequency);
  software update;
  action to throttle traffic;
  amendment of traffic routing rules;
  action to block an address and/or port; and/or
  configuration of a VPN.

The orchestrator 120 and the controller 130 are each in communication with the NRAE 140, such that the orchestrator is available to communicate with the controller via the NRAE. The NRAE is configured to receive reconfiguration instructions from the orchestrator 120, and to analyse the reconfiguration instructions so as to accept or to reject the reconfiguration instructions from being communicated to, and therefore implemented by, the controller 130.

Figure 2:
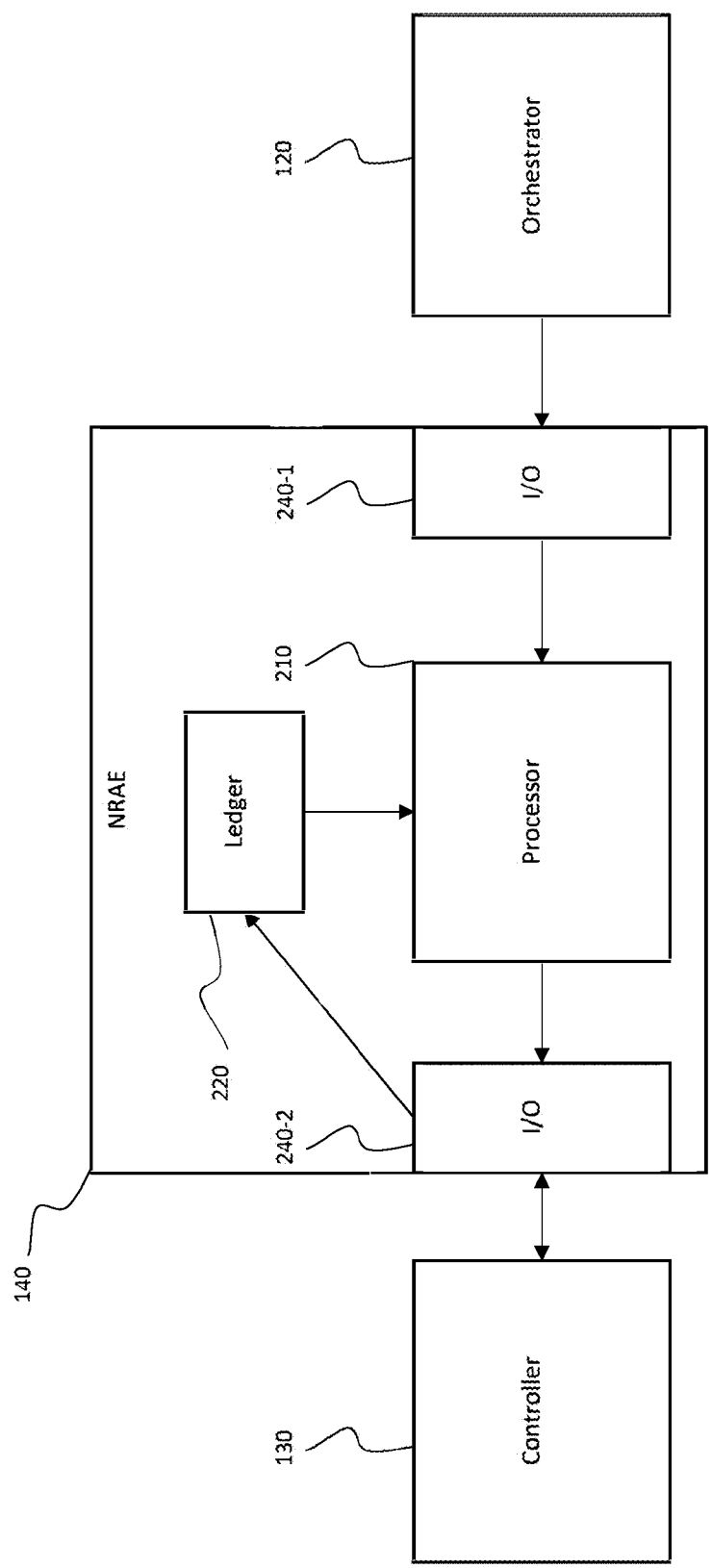
FIG. 2 is a schematic detailed view of the NRAE.

FIG. 2 is a detailed schematic diagram of the NRAE 140, which comprises: a processor 210; an electronic database (herein also referred to as the network ledger) 220; and first 240-1 and second 240-2 input and output interfaces.

By means of the first 240-1 input and output interface, the NRAE 140, and specifically the processor 210, is available to communicate with the orchestrator 120 so as to receive reconfiguration instructions.

By means of the second input and output interface 240-2, the NRAE 140, and specifically the processor 210, is available to communicate reconfiguration instructions to the controller 130. Likewise, by means of the second input and output interface 240-2, the network ledger 220 is available to communicate with the controller 130.

The network ledger 220 stores a history of reconfiguration instructions (including the constituent reconfiguration parameters) that have already been implemented in the network 110-1. Against each reconfiguration instruction stored in the network ledger 220, there is also stored status information from each target network node 150. The status information is retrieved both before (also referred to as "pre-reconfiguration status information") and after (also referred to as "post-reconfiguration status information") implementation of a reconfiguration instruction, and stored in association with said reconfiguration instruction.

The status information includes information pertaining to performance and operational characteristics of a network node, and includes, for example: processing load; memory capacity; bandwidth; latency; jitter; ping; listing of routing tables and/or neighbours; security policies and rules; Quality of Service (QoS) information; software (including operating system) type and version; and/or hardware type and version.

In one example, the network ledger 220 is configured as described in UK Patent Application No. 2004696.7 in the name of British Telecommunications plc (Applicant's reference: A33834GBp01), the contents of which are herein incorporated by reference.

As described in more detail below, before a reconfiguration instruction is implemented, the NRAE 140 is configured to assess—based on a history of monitored effects of similar reconfiguration instructions—whether the reconfiguration instruction is sufficiently likely to cause a detrimental effect on the performance of the network 110-1. Performance may include: processing load; bandwidth; latency; jitter; ping; packet loss rate; and/or Service Level Agreement compliance.

Figure 3:
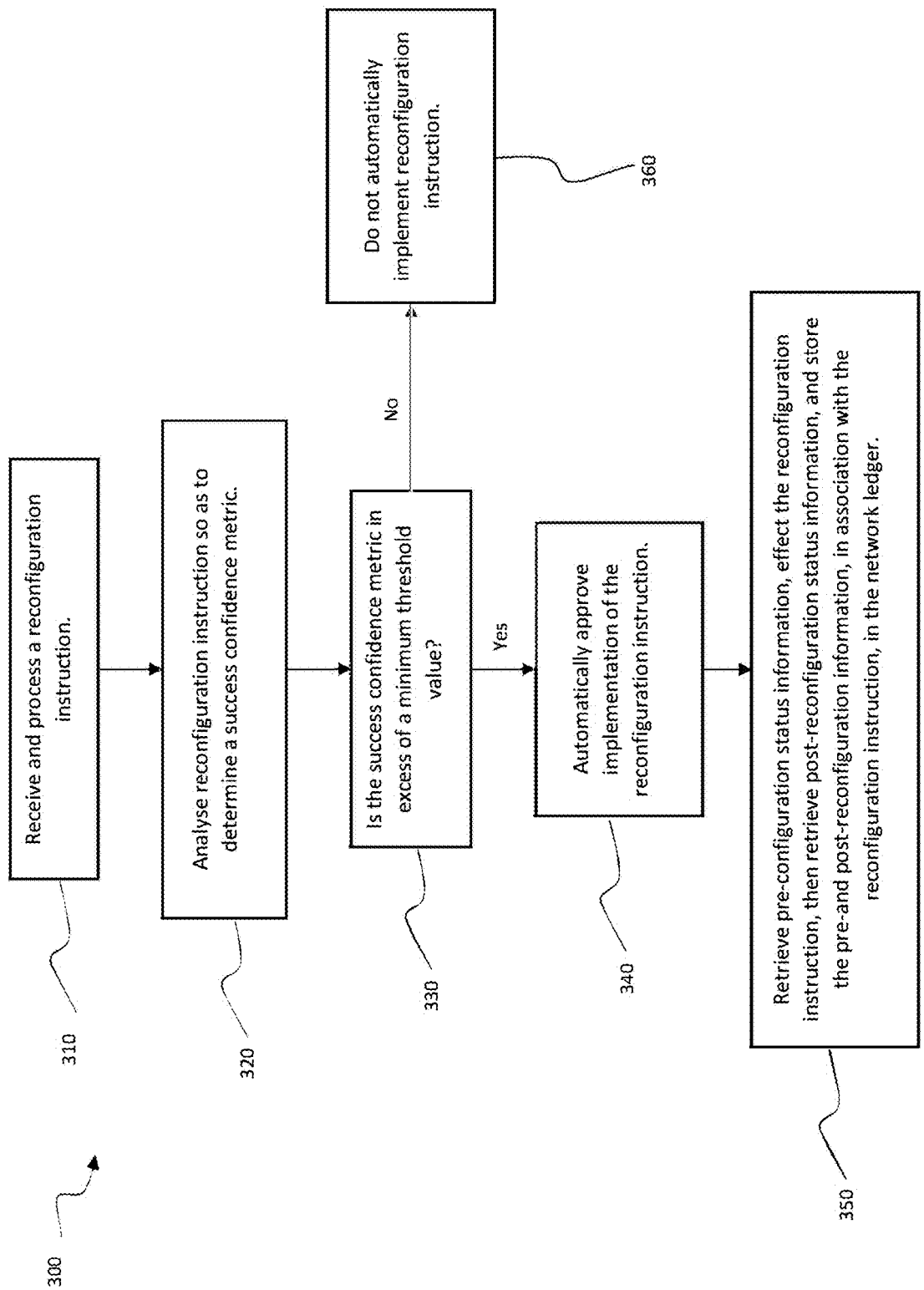
FIG. 3 shows a method for operating the telecommunications network.

FIG. 3 shows a process 300 by which a reconfiguration instruction is processed by the network 110-1, and in particular by the NRAE 140.

In a first step 310, a reconfiguration instruction is generated by the orchestrator 120 (which may, for example, have been initially generated by a human operator of the network 110-1). Prior to communicating the reconfiguration instruction to the controller 130 (i.e. effectively before causing the reconfiguration instruction to be implemented), the reconfiguration instruction is communicated by the orchestrator 120 to the NRAE 140 via the first input and output interface 240-1, and then received by the processor 210.

At a next step 320, the processor 210 analyses the reconfiguration instruction so as to determine a success confidence metric, which is indicative of a probability that the reconfiguration instruction will not cause an unintentional detrimental effect on the performance of the network 110-1. As described in more detail below with reference to FIG. 4, the success confidence metric is determined based on identifying and then assessing the effects of sufficiently-similar historical reconfiguration instructions based on data stored in the network ledger 220.

The processor 210 then assess whether the success confidence metric is at least equal to a minimum threshold value 330; if so, then the processor 210 permits the reconfiguration instruction to be implemented by the controller 130 without further user input 340. For example, this is initiated by the processor 210 communicating, via the second input and output interface 240-2, the reconfiguration instruction to the controller 130.

At a next step 350, the network ledger 220 is updated in response to permitting the reconfiguration instruction to be implemented. To do so, upon receipt of the reconfiguration instruction at the controller 130, but prior to effecting said reconfiguration instruction, the controller 130 retrieves pre-reconfiguration status information from each target network node and communicates the pre-reconfiguration status information to the network ledger 220, where it is recorded.

Next, the controller 130 implements the reconfiguration instruction in the network 110-1 by communicating the appropriate reconfiguration action(s) to the appropriate network node(s).

After successfully effecting the reconfiguration instruction, the controller retrieves post-reconfiguration status information from the target network nodes, and the post-reconfiguration status information is also communicated to, and recorded in, the network ledger.

Both the pre- and post-reconfiguration status information is stored in the network ledger in association with the reconfiguration instruction. In this way, the reconfiguration instruction is recorded in the network ledger as a historically-implemented reconfiguration instruction.

If, however, the processor 210 determines that the success confidence metric is less than the minimum threshold value, then the processor 210 stops 360 the reconfiguration instruction from being effected by the controller 130, for example by intercepting the reconfiguration instruction and preventing onward communication 360 of the reconfiguration instruction to the controller 130.

In one example, the processor 210 generates an alert for a human operator of the network 110-1 of the decision to prevent implementation of the reconfiguration instruction. In response, the NRAE 140 is available to be overridden by the human operator, thereby to allow the reconfiguration instruction to be implemented. Alternatively, an amended reconfiguration instruction may be submitted 300 for reassessment according to a further iteration of process 300.

Figure 4:
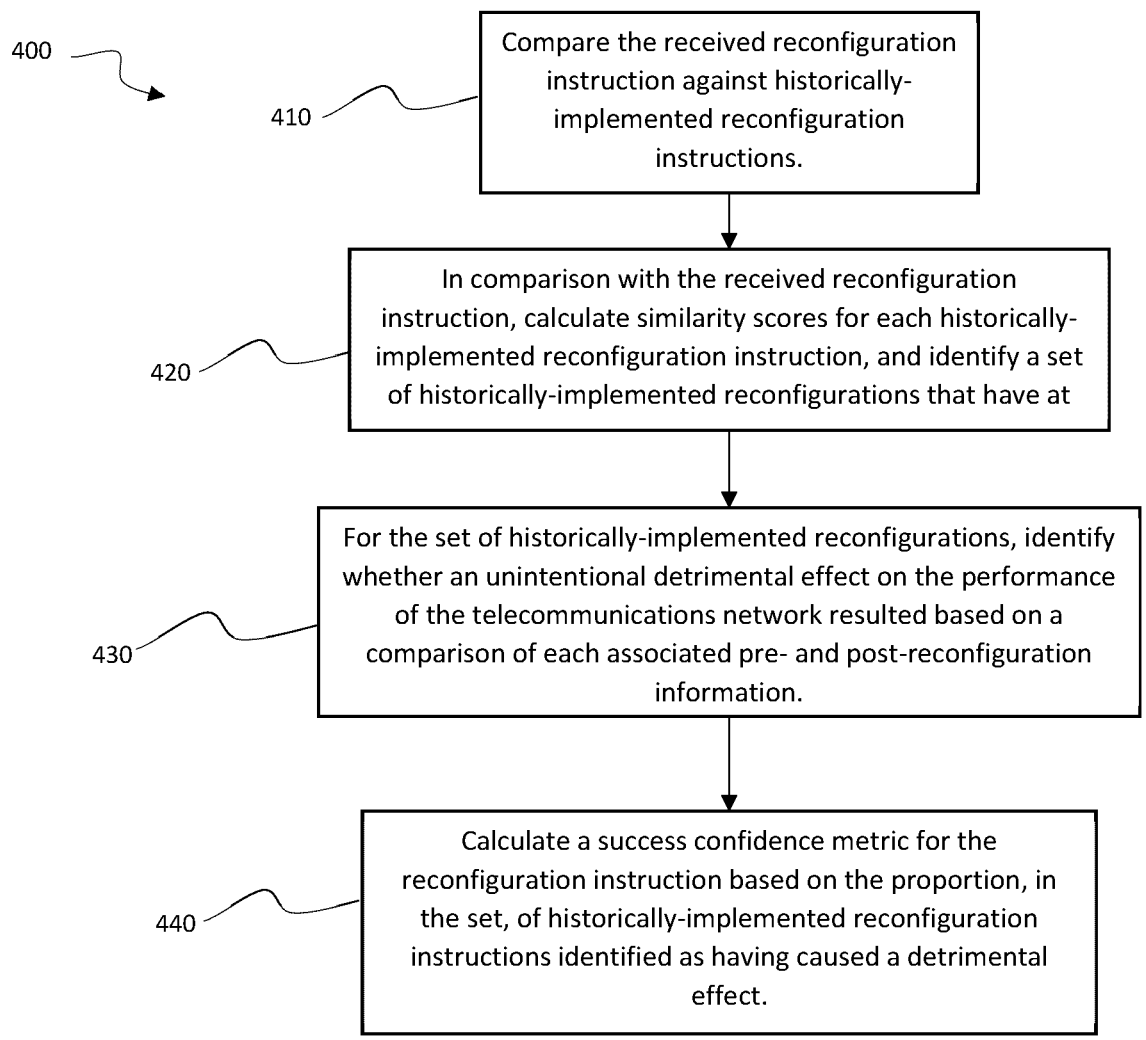
FIG. 4 shows a process performed as part of the method for operating the telecommunications network.

As part of step 320, FIG. 4 shows an exemplary sub-process 400 for calculating the success confidence metric for a reconfiguration instruction based on information stored in the network ledger 220.

At a first step 410, the processor 210 performs a similarity comparison between: the reconfiguration parameters (i.e. the reconfiguration action and/or the target nodes) of the reconfiguration instruction (i.e. as received at step 310); and the reconfiguration parameters of historically-implemented reconfiguration instructions that are stored in the network ledger 220.

At a next step 420, based on the comparison performed in the preceding step, the processor 210 calculates a similarity score for each of the historically-implemented reconfiguration instructions, in which the similarity score is indicative of an extent to which the reconfiguration parameters of a historically-implemented reconfiguration instructions are identical to the reconfiguration parameters of the reconfiguration instruction. A maximum similarity score denotes equivalence.

The processor 210 then identifies a set of historically-implemented reconfiguration instructions having a similarity score exceeding a minimum pre-determined threshold similarity score; this set consists of historically-implemented reconfiguration instructions that are identified as being sufficiently similar to the reconfiguration instruction.

For example, for a reconfiguration instruction to establish a new VPN at a given set of nodes, historically-implemented reconfiguration instructions that perform the same action (i.e. establishment of a VPN) at the same (or only the same) target nodes, are identified as being sufficiently similar. The identification of sufficiently similar historically-implemented reconfiguration instructions is available to be performed within a degree of tolerance.

At a next step 430, the processor 210 retrieves from the network ledger 220 pre- and post-reconfiguration status information associated with each of the historically-implemented reconfiguration instructions in the set identified at step 420. The processor then compares the pre- and post-reconfiguration status information for each historically-implemented reconfiguration instructions so as to identify historically-implemented reconfigurations in which the post-reconfiguration information shows (in comparison with the associated pre-reconfiguration information) that the telecommunications network 110-1 (as a whole or for a part thereof) is caused, unintentionally, to perform worse than prior to effecting the historically-implemented reconfiguration.

The term "unintentionally" is used to connote an effect that is not explicitly instructed in a reconfiguration instruction, since it will be appreciated that some reconfiguration instructions may intentionally (from the perspective of an operator of the network 110-1) be configured to degrade performance of the network 110-1, or a portion thereof. As such, to identify such intention, the processor compares the effect of a historically-implemented reconfiguration instruction against the reconfiguration parameters of that historically-implemented reconfiguration instruction. For example, a reconfiguration instruction that comprises a reconfiguration action to reduce processing resources of a single target network node by 50% and that subsequently causes only a 50% reduction in processing resources of only that single target network node does not qualify as a historically-implemented reconfiguration instruction that unintentionally causes worsening performance, since the detrimental effect is wholly explicitly instructed by the reconfiguration instruction. However, if the same reconfiguration instruction instead causes a complete reduction of processing resources of the single target network node, as well as for another (non-target) network node, then this historically-implemented reconfiguration qualifies as a having unintentionally caused worsening performance, since the effect is not wholly as explicitly instructed in terms of a degradation in network performance.

At a final step 440, a success confidence metric is calculated based on the proportion of the identified set of historically-implemented reconfiguration instructions that are identified as having caused an unintentional detrimental effect on the performance of the network; that is, a higher proportion yields a lower success confidence metric.

The success confidence metric that is output at step 440 is then available to be used as part of the processing at step 320.

In one example, the NRAE 140 is available to utilise further parameters to determine the success confidence metric, for example:
 environmental conditions, including weather conditions (e.g. such that adverse weather conditions may bias towards a lower success confidence metric);
 current or forecast (e.g. based on time of day) network performance and/or load of the network 110-1 (as a whole or for individual network nodes thereof);
 external events that may load the telecommunications network (e.g. a sporting event, a television event, a holiday, a concert or festival, a notable news event, etc.);
 a risk value associated with a reconfiguration instruction, said value denoting an extent of change instructed by the reconfiguration instruction (e.g. based on the type of reconfiguration action, the number of target nodes, and/or the permanency of the reconfiguration action), such that a more intensive and/or extensive reconfiguration instruction may carry with it a higher risk value, and therefore lead to a lower success confidence metric;
 a success rate value for an agent (e.g. a human operator of the network 110-1) from whom the reconfiguration instruction originated, such that a success confidence metric is biased higher for an agent having a history of instructing reconfiguration instructions that have not resulted in unintentional detrimental effects;
   to facilitate this, each historically-implemented reconfiguration instruction is available to be associated in the network ledger with an identity of the agent from whom the historically-implemented reconfiguration instruction originated. In this way, the processor 210 can determine a success rate of a given agent's reconfiguration instructions; and
 hardware and/or software specifications of the target node, which may in particular help identify hardware or software-based incompatibilities for specific reconfiguration instructions; and
 sequence information of a chain of historically-implemented reconfiguration instruction that may result in degrading network performance, which is enabled by the network ledger sequentially storing historically-implemented reconfiguration instructions.

Process 300 (and therefore process 400 also) is(/are) available to be initiated in response to each and every reconfiguration instruction. As a result, the network ledger is populated with an exhaustive record of all reconfiguration instructions that have successfully been applied to the network 110-1, along with associated pre- and post-reconfiguration status information. In turn, the network ledger is available to facilitate additional functionality so as to help improve reliability with which the network 110-1 is reconfigured. In this way, the network ledger is also available to act as a repository of training data so as to train a machine learning algorithm for automatically implementing beneficial network reconfigurations and/or preventing potentially-detrimental network reconfigurations.

Alternatives and Modifications

In an alternative example of the process 300, in response to identifying that the success confidence metric is below the minimum threshold value (as per step 330), following step 360 in which automatic implementation of the reconfiguration instruction is prevented, the processor 210 is available to identify a substitute reconfiguration instruction for the received (and rejected) reconfiguration instruction from the historically-implemented reconfiguration instructions in the ledger 220, in which the substitute reconfiguration instruction achieves a success confidence metric (as calculated at step 320, at least as per process 400) in excess of the minimum threshold value (as required at step 330), whilst maximising the similarity score with the received reconfiguration instruction. The substitute reconfiguration instruction is then available to be communicated to a human operator of the telecommunications network for approval.

In one example, after step 360, the NRAE 140 is available first to implement the received reconfiguration instruction in a clone network (i.e. a telecommunications network that mimics the architecture of the network 110-1 on live infrastructure of the network 110-1, but without carrying live traffic or live services) and/or a reference network (i.e. a telecommunications network that mimics the network 110-1, but on infrastructure that is separate to the network 110-1, such as test equipment). The results of the implementation of the reconfiguration instruction on the clones and/or reference network may be used further to assess (e.g. by a human operator) as to whether or not the reconfiguration instruction is safe to implement on the live network 110-1.

In FIG. 1, a backbone of the network 110-1 is centred upon a Multiprotocol Label Switching (MPLS) router. However, it will be appreciated that the network 110-1 is available to have any form of cellular network architecture including 3G, 4G and/or 5G architectures.

In the aforementioned, the network 110-1 is described as a wide area cellular telecommunications network. However, in an alternative example, network 110-1 is available to be any form of orchestrator-operated telecommunications network, including a fixed-access network, a local area network, a wide area network, a satellite telecommunications network, or a combination of network types (e.g. a HetNet).

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A computer-implemented method of operating a telecommunications network, said telecommunications network comprising a plurality of nodes, and the method comprising the steps of:
 storing:
   a set of historic reconfiguration instructions, said instructions having been used to reconfigure the telecommunications network;
   first status information from each of the plurality of nodes, wherein said first status information is received prior to reconfiguring the telecommunications network according to a given historic reconfiguration instruction; and
   second status information from each of the plurality of nodes, wherein said second status information is received after reconfiguring the telecommunications network according to the given historic reconfiguration instruction;
receiving a new reconfiguration instruction;
prior to reconfiguring the telecommunications network according to the new reconfiguration instruction, identifying, from the set, a similar historic reconfiguration instruction having a similarity to the new reconfiguration instruction within a tolerance threshold;
comparing the first and the second status information associated with the identified similar historic reconfiguration instruction so as to determine whether the identified similar historic reconfiguration instruction resulted in a detrimental effect to performance of the telecommunications network;
in dependence on whether the identified similar historic reconfiguration instruction resulted in a detrimental effect, calculating a success confidence metric for the new reconfiguration instruction, said metric representing a probability that a reconfiguration instruction does not result in a detrimental effect to performance of the telecommunications network; and
if the success confidence metric is:
greater than a predetermined threshold value, reconfiguring the telecommunications network according to the new reconfiguration instruction; or
less than a predetermined threshold value, preventing reconfiguration of the telecommunications network according to the new reconfiguration instruction.

2. A method according to claim 1, wherein identifying the similar historic reconfiguration instruction comprises comparing a similarity of a target node of each historic reconfiguration instruction to a target node of the new reconfiguration instruction.

3. A method according to claim 1, wherein identifying the similar historic reconfiguration instruction comprises comparing a similarity of a reconfiguration action of each historic reconfiguration instruction to a reconfiguration action of new reconfiguration instruction.

4. A method according to claim 1, further comprising the step of determining a level of similarity between the new reconfiguration instruction and the identified similar historic reconfiguration instruction, wherein the success confidence metric is calculated in dependence on said level of similarity.

5. A method according to claim 1, further comprising the step of determining an extent of the detrimental effect to performance, and wherein the success confidence metric is calculated in dependence on said extent of the detrimental effect.

6. A method according to claim 1, wherein the success confidence metric is calculated as a function of a proportion of: a total number of identified similar historic reconfigurations that are determined to have resulted in a detrimental effect to performance; and the total number of identified similar historic reconfigurations.

7. A method according to claim 1, further comprising the steps of:
prior to reconfiguring the telecommunications network according to the new reconfiguration instruction, receiving and storing, in respect of the new reconfiguration instruction, first status information from each of the plurality of nodes;
in response to reconfiguring the telecommunications network according to the new reconfiguration instruction, receiving and storing, in respect of the new reconfiguration instruction, second status information from each of the plurality of nodes; and
storing the new reconfiguration instruction, wherein said new reconfiguration instruction is available to be a historic reconfiguration instruction in a further iteration of the method.

8. A method according to claim 1, further comprising the steps of identifying a plurality of similar historic reconfiguration instructions, and calculating the success confidence metric in dependence on all of the identified similar historic reconfiguration instructions.

9. A method according to claim 8, further comprising the steps of:
in the event of preventing reconfiguration of the telecommunications network according to the new reconfiguration instruction, identifying, from the plurality of similar historic reconfiguration instructions, a substitute historic reconfiguration instruction that is determined not to have resulted in a detrimental effect; and
reconfiguring the telecommunications network according to the substitute historic reconfiguration instruction.

10. A method according to claim 1, further comprising the step of receiving and storing sequence information of a sequence in which the historic reconfiguration instructions are used to reconfigure the telecommunications network, wherein identifying the similar historic reconfiguration instruction comprises comparing the sequence information of each historic reconfiguration instruction to the sequence information reconfiguration action of new reconfiguration instruction.

11. A method according to claim 1, wherein calculating the success confidence metric is further performed in dependence upon a risk value associated with the new reconfiguration instruction.

12. A non-transitory computer-readable carrier medium comprising a computer program, which, when the computer program is executed by a computer, causes the computer to carry out the steps of claim 1.

13. A telecommunications network comprising:
a plurality of nodes;
a database configured to store:
a set of historic reconfiguration instructions, said instructions having been used to reconfigure the telecommunications network;
first status information from each of the plurality of nodes, wherein said first status information is received prior to reconfiguring the telecommunications network according to a given historic reconfiguration instruction; and
second status information from each of the plurality of nodes, wherein said second status information is received after reconfiguring the telecommunications network according to the given historic reconfiguration instruction;
a processor configured to:
receive a new reconfiguration instruction;
identify, prior to reconfiguring the telecommunications network according to the new reconfiguration instruction, from the set, a similar historic reconfiguration instruction having a similarity to the new reconfiguration instruction within a tolerance threshold;
compare the first and the second status information associated with the identified similar historic reconfiguration instruction so as to determine whether the identified similar historic reconfiguration instruction resulted in a detrimental effect to performance of the telecommunications network;

calculate, in dependence on whether the identified similar historic reconfiguration instruction resulted in a detrimental effect, a success confidence metric for the new reconfiguration instruction, said metric representing a probability that a reconfiguration instruction does not result in a detrimental effect to performance of the telecommunications network; and a controller configured to:
reconfigure the telecommunications network according to the new reconfiguration instruction if the success confidence metric is greater than a predetermined threshold value; and prevent reconfiguration of the telecommunications network according to the new reconfiguration instruction if the success confidence metric is less than a predetermined threshold value.

14. A telecommunications network according to claim 13, wherein the telecommunications network is in the form of a wide area cellular telecommunications network.

15. A telecommunications network according to claim 13 wherein in order to identify the similar historic reconfiguration instruction, the processor is configured to compare a similarity of a target node of each historic reconfiguration instruction to a target node of the new reconfiguration instruction.

16. A telecommunications network according to claim 13 wherein in order to identify the similar historic reconfiguration instruction, the processor is configured to compare a similarity of a reconfiguration action of each historic reconfiguration instruction to a reconfiguration action of new reconfiguration instruction.

17. A telecommunications network according to claim 13 wherein the processor is further configured to determine a level of similarity between the new reconfiguration instruction and the identified similar historic reconfiguration instruction, wherein the success confidence metric is calculated in dependence on said level of similarity.

18. A telecommunications network according to claim 13 wherein the processor is further configured to determine an extent of the detrimental effect to performance, and wherein the success confidence metric is calculated in dependence on said extent of the detrimental effect.

19. A telecommunications network according to claim 13 wherein the success confidence metric is calculated as a function of a proportion of: a total number of identified similar historic reconfigurations that are determined to have resulted in a detrimental effect to performance; and the total number of identified similar historic reconfigurations.

20. A telecommunications network according to claim 13 wherein the processor is further configured to identify a plurality of similar historic reconfiguration instructions, and calculate the success confidence metric in dependence on all of the identified similar historic reconfiguration instructions.

* * * * *